(12) United States Patent
Maaninen

(10) Patent No.: US 8,948,529 B1
(45) Date of Patent: Feb. 3, 2015

(54) MULTI-PASS ENCODING

(71) Applicant: Google Inc., Mountain View, CA (US)

(72) Inventor: Juha-Pekka Maaninen, Oulu (FI)

(73) Assignee: Google Inc., Mountain View, CA (US)

( * ) Notice: Subject to any disclaimer, the term of this patent is extended or adjusted under 35 U.S.C. 154(b) by 162 days.

(21) Appl. No.: 13/663,724

(22) Filed: Oct. 30, 2012

(51) Int. Cl.
*G06K 9/36* (2006.01)
*G06T 9/00* (2006.01)

(52) U.S. Cl.
CPC ........................... *G06T 9/004* (2013.01)
USPC ............ 382/238; 382/232; 382/236; 382/244

(58) Field of Classification Search
CPC ....... H04N 7/50; H04N 7/30; H04N 7/26244; H04N 7/26313; H04N 7/26106; H04N 7/34; G06T 9/004
USPC .......... 382/232, 236, 238, 244; 370/276, 278; 341/51; 375/240.01, 240, 12, 240.13, 375/240.14, 240.15, E7.151, E7.153, 375/E7.088, E7.139
See application file for complete search history.

(56) References Cited

U.S. PATENT DOCUMENTS

| | | | |
|---|---|---|---|
| 6,192,154 B1 | 2/2001 | Rajagopalan et al. | |
| 6,252,905 B1 * | 6/2001 | Pokrinchak et al. | 375/240.14 |
| 7,295,612 B2 * | 11/2007 | Haskell et al. | 375/240.15 |
| 7,856,059 B2 * | 12/2010 | Haskell et al. | 375/240.15 |
| 8,325,807 B2 * | 12/2012 | Nilsson et al. | 375/240.13 |
| 2006/0045367 A1 | 3/2006 | Chao et al. | |
| 2006/0159166 A1 | 7/2006 | Mohsenian | |
| 2008/0130989 A1 | 6/2008 | Moriya et al. | |
| 2010/0303148 A1 | 12/2010 | Hiron et al. | |

FOREIGN PATENT DOCUMENTS

| | | |
|---|---|---|
| EP | 0924933 A1 | 6/1999 |
| WO | 2004004359 A1 | 1/2004 |
| WO | 2004105393 A1 | 12/2004 |
| WO | 2006099082 A2 | 9/2006 |
| WO | 2007008355 A2 | 1/2007 |
| WO | 2009045683 A1 | 4/2009 |

* cited by examiner

*Primary Examiner* — Anh Do

(57) ABSTRACT

In accordance with aspects of the disclosure, devices and methods are provided for receiving uncompressed image data and performing multi-pass encoding of the uncompressed image data including encoding a frame of the uncompressed image data in a first pass, storing predictor pixels from the encoded frame in a memory, and re-encoding the frame of the uncompressed image data in a second pass using the stored predictor pixels from the first pass.

20 Claims, 9 Drawing Sheets

FIG. 2C

MULTI-PASS ENCODING

TECHNICAL FIELD

The present disclosure relates to multi-pass encoding.

BACKGROUND

In some implementations, conventional video compression techniques use a multi-stage pipeline to improve performance. For instance, different portions of video encoding techniques are separated into stages, such as one stage of the pipeline performs motion estimation, another stage performs a final coding type decision, and another stage performs quantization and reconstruction. One problem with this multi-stage approach is that, in reference to timing, the motion estimation stage can be too far from the reconstruction stage. For instance, when estimating motion for an arbitrary macroblock N, a previous macroblock N−1 (e.g., a left neighbor) has not yet been reconstructed. Therefore, the encoder may not be able to use data in a desirable fashion for motion estimation. This can create both visual artifacts and hamper compression efficiency. As such, there exists a need to improve conventional video compression techniques to reduce errors.

SUMMARY

In accordance with aspects of the disclosure, a device may be provided for multi-pass encoding. The device may include a memory and an encoder configured to receive uncompressed image data and perform multi-pass encoding of the uncompressed image data. The encoder may include a first pass module configured to encode a frame of the uncompressed image data in a first pass, a prediction module configured to store predictor pixels from the encoded frame in the memory, and a second pass module configured to re-encode the frame of the uncompressed image data in a second pass using the predictor pixels stored by the prediction module from the first pass.

In accordance with aspects of the disclosure, a method may be provided for multi-pass encoding. The method may include receiving uncompressed image data at an encoder and performing multi-pass encoding of the uncompressed image data at the encoder, including encoding a frame of the uncompressed image data in a first pass, storing predictor pixels from the encoded frame in a memory, and re-encoding the frame of the uncompressed image data in a second pass using the stored predictor pixels from the first pass.

In accordance with aspects of the disclosure, an apparatus may be provided for multi-pass encoding. The apparatus may include a module configured to receive uncompressed image data and perform a first encoding of the uncompressed image data by encoding at least one block of the uncompressed image data in a first pass, a prediction module configured to store predictor pixels from the at least one encoded block in memory, and another module configured to perform a second encoding of the uncompressed image data by encoding the at least one block of the uncompressed image data in a second pass using the predictor pixels stored from the first pass.

The details of one or more implementations are set forth in the accompanying drawings and the description below. Other features will be apparent from the description and drawings, and from the claims.

BRIEF DESCRIPTION OF THE DRAWINGS

FIGS. 2B-2C are block diagrams illustrating example frames represented by blocks of pixels, in accordance with aspects of the disclosure.

DETAILED DESCRIPTION

In accordance with aspects of the disclosure, to overcome the deficiencies of conventional video compression techniques, systems and methods are provided herein for a multi-pass (e.g., a two-pass) intra-prediction mode selection for encoders, including hardware (HW) video encoders. In some implementations, the devices and methods provided herein adjust encoding architecture to perform multi-pass encoding including two-pass encoding. For instance, after receiving uncompressed image data, a first pass may be used to encode and/or store a frame of the uncompressed image data (e.g., an entire input frame as-is). For one or more macroblocks within the frame, predictor pixels may be stored in a separate memory area. In an example, the frame may include a plurality of pixels divided into blocks of pixels, the predictor pixels may include a sequence of pixels along an edge of one or more blocks of pixels that are neighboring another block of pixels, and the predictor pixels may be stored as the sequence of pixels of the one or more blocks of pixels that are neighboring another block of pixels in memory. After storing the predictor pixels, a second pass may be used to encode the frame again. As a result of using this technique, the encoder may use predictor pixels from the first pass to use in intra-prediction mode selection for the second pass. As such, this intra-prediction mode technique may provide an improved approximation of actual predictors to reduce visual artifacts and improve compression efficiency. In some examples, performance may be roughly halved as one or more frames may be encoded twice. However, in other instances, since the bitstream and the reconstructed image from the first pass may not need to be used or stored in memory, generated bus load may be reduced. Further, more calculations and data may be collected from the first pass to improve compression efficiency and visual quality.

Figure 1:
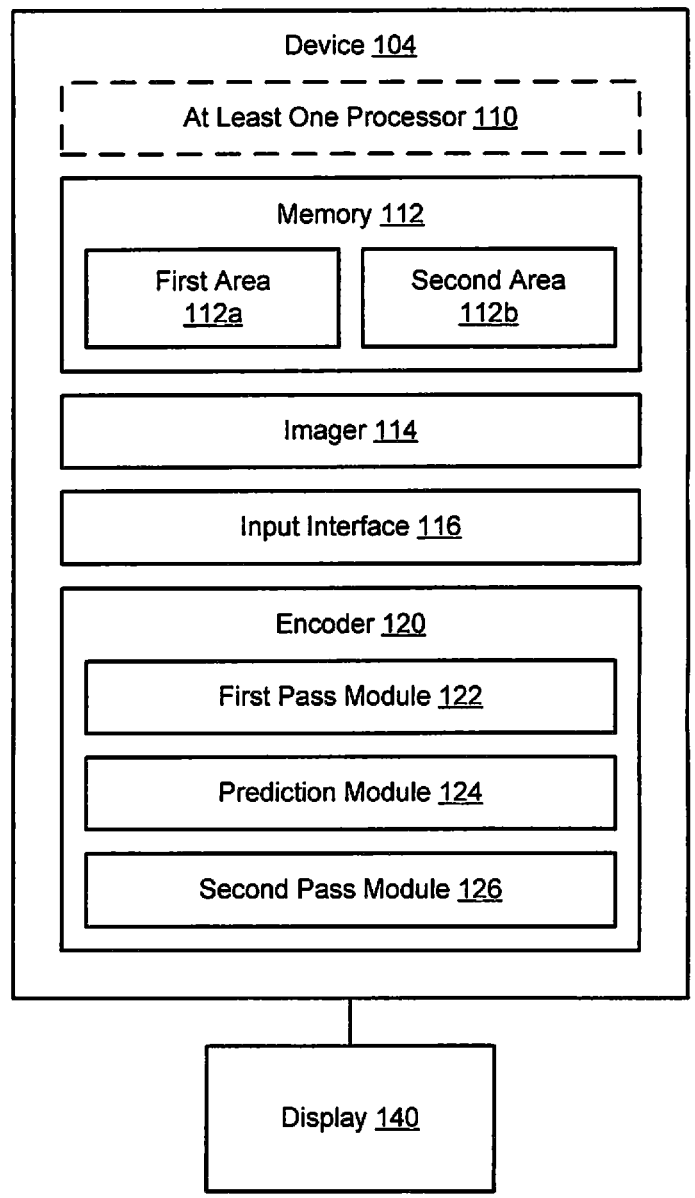
FIG. 1 is a block diagram illustrating an example system for multi-pass encoding, in accordance with aspects of the disclosure.

FIG. 1 is a block diagram illustrating an example system 100 for multi-pass encoding, in accordance with aspects of the disclosure.

In the example of FIG. 1, the system 100 comprises a multi-pass encoding system that may be associated with a device 104, thereby transforming the device 104 into a special purpose machine designed to implement multi-pass encoding, as described herein. In this sense, the device 104 may include any standard element(s), including at least one optional processor 110, memory (e.g., non-transitory computer-readable storage medium) 112, power, peripherals, and various other elements not specifically shown in FIG. 1. The memory 112 may include one or more areas, such as a first area 112a and a second area 112b. Further, the device 104 may include a display 140 (e.g., monitor or some other display) that may be used to display images (e.g., static images and/or video images). In some instances, various other elements of the device 104 that may be useful to implement the device 104 may be added or included, without departing from the scope of the present disclosure.

The multi-pass encoding system 100 may include an imager or an imaging sensor 114 configured to capture an image or images and generate uncompressed image data of the captured image or images. The imager 114 may comprise any device that converts an optical image into an electronic signal. In an example, the imager 114 may comprise a video camera configured to capture a plurality of sequential images and generate uncompressed image data of the sequentially captured images. The imager 114 may include one or more sensors (e.g., any type of detector, such as a focal plane array) for capturing image signals representative of an image or images. The sensors of the imager 114 provide for representing (e.g., converting) a captured image signal of an image or images as digital data (e.g., via an analog-to-digital converter included as part of the sensor or separate from the sensor as part of imaging system 100).

In an example, the imager 114 may include a static camera configured to capture a single static image and generate uncompressed image data of the captured image. In another example, the imager 114 may include a video camera configured to capture a plurality of sequential images and generate uncompressed image data of the sequentially captured images.

The multi-pass encoding system 100 may include an input interface 116 configured to receive image data from an external source including uncompressed image data. The input interface 116 may be configured to receive image data (e.g., static images and/or input video) streamed from another device. The input interface 116 may include one or more inputs (e.g., any type of input) for receiving image signals representative of an image or images. The one or more inputs of the input interface 116 may provide for receiving image signals of an image or images as digital data (e.g., via an analog-to-digital converter included as part of the input interface 116 or separate from the input interface 116 as part of the device 104).

The multi-pass encoding system 100 may include an encoder 120 configured to receive uncompressed image data and perform multi-pass encoding of the uncompressed image data.

The encoder 120 may include a first pass module 122 configured to encode a frame of the uncompressed image data in a first pass. The first pass module 122 may include a circuit, such as a logic circuit. In an example, the frame may include at least one frame from a plurality of frames including a plurality of sequential frames. In another example, the frame may include an entire frame, and the first pass module 122 may be configured to encode the entire frame of the uncompressed image data.

In an example, the encoder 120 may be configured to select a first intra-prediction mode of operation by using the first pass module 122 to encode the frame of the uncompressed image data in the first pass using the predictor pixels from the first pass as part of the first intra-prediction mode selection.

The encoder 120 may include a prediction module 124 configured to store predictor pixels (which may be referred to as intra-mode selection pixels) from the encoded frame in memory (e.g., memory 112). In an example, the frame may include a plurality of pixels divided into blocks of pixels. The predictor pixels may include a sequence of pixels along an edge of one or more blocks of pixels that are neighboring another block of pixels. In this example, the prediction module 124 may be configured to store the predictor pixels as the sequence of pixels of the one or more blocks of pixels that are neighboring another block of pixels in memory (e.g., memory 112).

In another example, the frame may include a plurality of pixels divided into blocks (which may be referred to as macroblocks) of pixels with the one or more blocks of pixels having columns of pixels. The predictor pixels may include a column of pixels along an edge of the one or more blocks of pixels that are neighboring another block of pixels having a neighboring column of pixels. In this example, the prediction module 124 may be configured to store the predictor pixels as the column of pixels of the one or more blocks of pixels that are neighboring the another block of pixels having the neighboring column of pixels in memory (e.g., memory 112).

In another example, the frame may include a plurality of pixels divided into blocks of pixels with the one or more blocks of pixels having columns of pixels. The predictor pixels may include a right-most column of pixels along an edge of the one or more blocks of pixels that are neighboring another block of pixels having a left-most neighboring column of pixels adjacent to right-most column of pixels. In this example, the prediction module 124 may be configured to store the predictor pixels as the right-most column of pixels of the one or more blocks of pixels that are neighboring the another block of pixels having the left-most neighboring column of pixels in memory (e.g., memory 112).

In another example, the frame may include a plurality of pixels divided into blocks of pixels with the one or more blocks of pixels having rows of pixels. The predictor pixels may include a row of pixels along an edge of the one or more blocks of pixels that are neighboring another block of pixels having a neighboring row of pixels. In this example, the prediction module 124 may be configured to store the predictor pixels as the row of pixels of the one or more blocks of pixels that are neighboring the another block of pixels having the neighboring row of pixels in memory (e.g., memory 112).

In another example, the frame may include a plurality of pixels divided into blocks of pixels with the one or more blocks of pixels having rows of pixels. The predictor pixels may include a bottom-most row of pixels along an edge of the one or more blocks of pixels that are neighboring another block of pixels having a top-most neighboring row of pixels adjacent to bottom-most row of pixels. In this example, the prediction module 124 may be configured to store the predictor pixels as the bottom-most row of pixels of the one or more blocks of pixels that are neighboring the another block of pixels having the top-most neighboring row of pixels in memory (e.g., memory 112).

The encoder 120 may include a second pass module 126 configured to re-encode the frame of the uncompressed image data in a second pass using the predictor pixels stored by the prediction module from the first pass. In an example, the encoder 120 may be configured to select a second intra-prediction mode of operation by using the second pass module 126 to re-encode the frame of the uncompressed image data in the second pass using the predictor pixels from the first pass as part of the intra-prediction mode selection.

In an implementation of the device 104, the imager 114 may be configured to capture an image or images and generate uncompressed image data of the captured image or images. In this instance, the encoder 120 may be configured to receive the uncompressed image data from the imager 114 and store the uncompressed image data in the first area 112a of the memory 112. The prediction module 124 may be configured to store the predictor pixels from the encoded frame in the second area 112b of the memory 112 that is separate from the first area 112a of the memory 112.

In an example, the imager 114 may include a static camera configured to capture a single static image and generate uncompressed image data of the captured image. In another example, the imager 114 may include a video camera configured to capture a plurality of sequential images and generate uncompressed image data of the sequentially captured images.

In an implementation of the device 104, the imager 114 may be configured to capture an image or images and generate uncompressed image data of the captured image or images. In this instance, the at least one optional processor 110 may be configured to receive the uncompressed image data from the imager 114 and provide the encoder 120 with the uncompressed image data.

In an implementation of the device 104, the input interface 116 may be configured to receive image data of image or images. In this instance, the encoder 120 may be configured to receive the image data from the input interface 116 and store the image data in the first area 112a of the memory 112. Further, the prediction module 124 may be configured to store the predictor pixels from the encoded frame in the second area 112b of the memory 112 that is separate from the first area 112a of the memory 112.

The display 140 may be configured to display at least one of the uncompressed image data of the captured image, the frame of the image data encoded in the first pass, and the frame of the encoded image data of the second pass. The display 140 may include an image display device (e.g., a liquid crystal display (LCD)) or some various other type of video display or monitor. The at least one optional processor 110 may be adapted to display image data on the display 140. The at least one optional processor 110 may be configured to retrieve and obtain image data from storage medium 112 and display any retrieved image data on the display 140. The display 140 may include display electronics, which may be utilized by the at least one optional processor 110 to display image data. The display 140 may receive image data directly from image sensor 114 via the at least one optional processor 110, and/or the image data may be transferred from the storage medium 112 via the at least one optional processor 110.

In the example of FIG. 1, the multi-pass encoding system 100 is illustrated using various functional blocks or modules that represent more-or-less discrete functionality. However, such illustration is provided for clarity and convenience, and thus, in some instances, the various functionalities may overlap or be combined within a described block(s) or module(s), and/or may be implemented by one or more block(s) or module(s) not specifically illustrated in the example of FIG. 1. Generally, conventional functionality that may be useful to the system 100 of FIG. 1 may be included even though such conventional elements are not illustrated explicitly, for the sake of clarity and convenience.

Figure 2A:
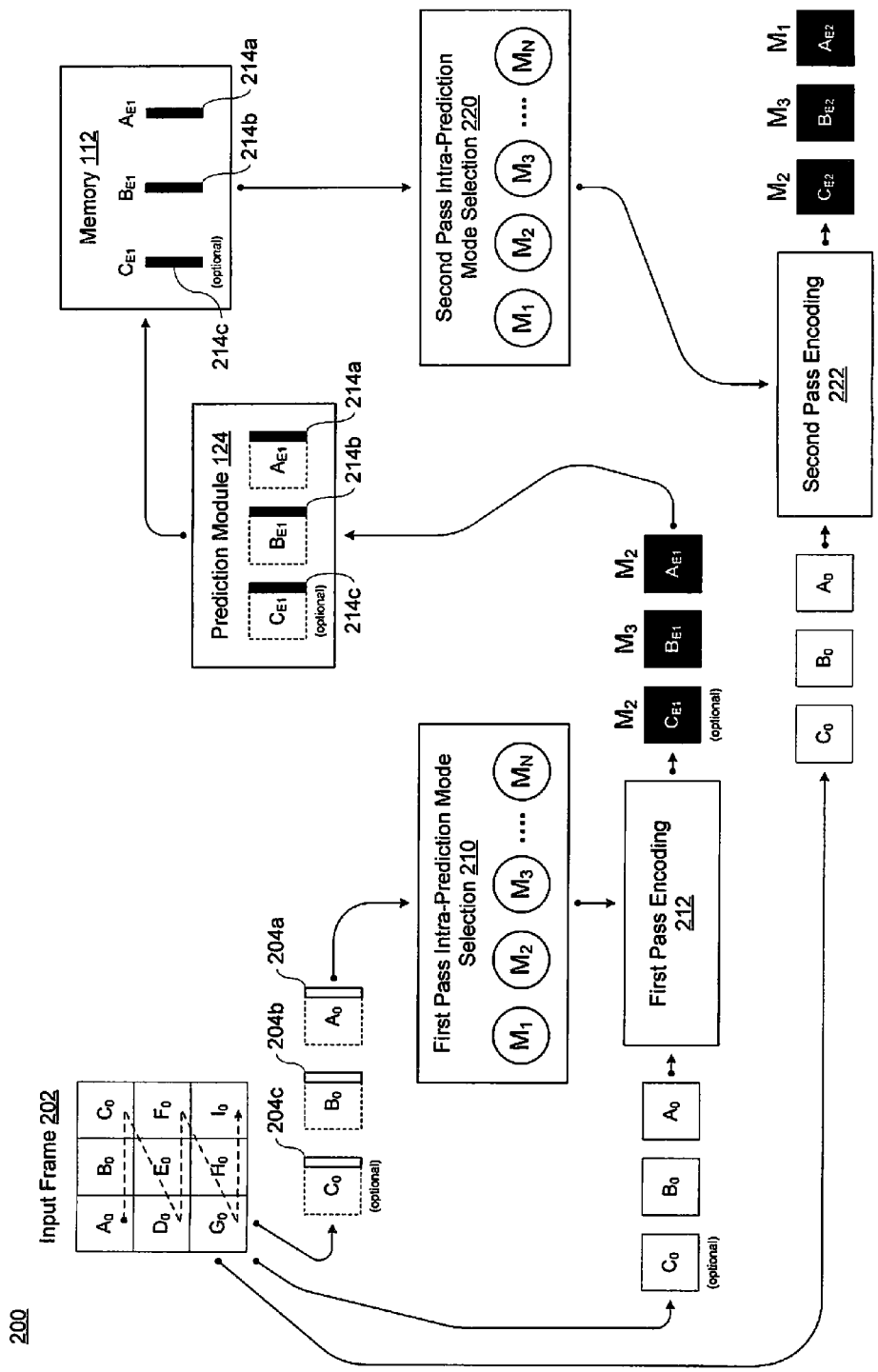
FIG. 2A is a block diagram illustrating an example process flow for multi-pass encoding, in accordance with aspects of the disclosure.

FIG. 2A is a block diagram illustrating an example process flow 200 for multi-pass encoding using selective intra-prediction based on pre-determined criteria, in accordance with aspects of the disclosure. In some instances, intra-prediction refers to a coding technique for smoothing transitions between and reducing spatial redundancy of neighboring pixel blocks (e.g., neighboring macroblocks) representing an image. Some video encoding techniques, such as VP8, H.264, and JPEG may utilize intra-prediction as an encoding tool to improve compression quality.

Referring to the example of FIG. 2A, the encoder 120 may be configured to receive an input frame 202 of uncompressed image data and perform a multi-pass encoding of the input frame 202. In an example, the encoder 120 may be configured to represent the frame 202 as a plurality of pixels divided into blocks of pixels (e.g., pixel blocks or macroblocks $A_0$, $B_0$, $C_0$, ..., $I_0$). In various implementations, the blocks of pixels may include any number of pixels formed in blocks of any dimension, such as, for example, 2×2, 2×4, 4×4, 2×8, 8×8, 8×16, 16×16, etc., without departing form the scope of the present disclosure. In an example, the encoder 120 may be configured to define predictor pixels (e.g., 204a, 204b, 204c, etc.) within the one or more blocks of pixels (e.g., $A_0$, $B_0$, $C_0$, etc.) to include a sequence of pixels along an edge (e.g., a right-most column of pixels) of the one or more blocks of pixels that are neighboring (e.g., adjacent to without intervening blocks, in contact with) another block of pixels. For instance, pixel block $A_0$ is a neighbor of pixel block $B_0$ and pixel block $B_0$ is a neighbor of pixel block $C_0$. In this instance, pixel block $C_0$ does not have a pixel block neighbor (to the right) when scanning from left to right across the input frame 202. In this instance, even though the predictor pixels are shown as columns, the predictor pixels may be shown as rows in an alternate implementation, without departing from the scope of the present disclosure.

The encoder 120 may be configured to use the first pass module 122 to encode the input frame 202 of the uncompressed image data (e.g., blocks of pixels $A_0$, $B_0$, $C_0$, etc.) in a first pass encoding 212 to generate (first) encoded blocks of pixels (e.g., $A_{E1}$, $B_{E1}$, $C_{E1}$, etc.). In this first pass encoding 212, a first intra-prediction mode of operation may be selected 210 by using the first pass module 122 to encode a sequence of input pixel blocks (e.g., $A_0$, $B_0$, $C_0$) of the input frame 202 in the first pass using the predictor pixels (e.g., 204a, 204b, 204c) from the first pass as part of the first intra-prediction mode selection 210 to generate the (first) encoded pixel blocks (e.g., $A_{E1}$, $B_{E1}$, $C_{E1}$, etc.) using the same or different intra-prediction modes (e.g., $M_1$, $M_2$, $M_3$ ... $M_N$). In this instance, the predictor pixels 204a for pixel block $A_0$ may be used for intra-prediction mode selection 210 for pixel block $B_0$, and the predictor pixels 204b for pixel block $B_0$ may be used for intra-prediction mode selection 210 for pixel block $C_0$. Further, in this instance, the predictor pixels 204c for pixel block $C_0$ may be considered optional since there is no pixel block neighbor adjacent to pixel block $C_0$ when scanning from left to right across the input frame 202. As such, encoded pixel block $C_{E1}$ may be considered optional for use in a second pass encoding 222.

In the first pass intra-prediction mode selection 210, at least one mode of a plurality of modes $M_1$, $M_2$, $M_3$ ... $M_N$ may be selected. The modes may include any number (N) of modes. For instance, one of the intra-prediction modes may include a VP8 intra-prediction mode for encoding data in VP8 format, which is an open video compression format representing a specification for digitally representing a video as a file or a bitstream. Further, one of the intra-prediction modes may include a H.264 intra-prediction mode for encoding data in H.264/MPEG-4 Part 10 or AVC (Advanced Video Coding) format, which is a standard for video compression and is currently used for recording, compression, and distribution of high definition (HD) video. Further, one of the intra-prediction modes may include a JPEG mode for encoding data in JPEG format, which is a commonly used method for digital image compression.

Referring to the example of FIG. 2A, the encoder 120 may be configured to use the prediction module 124 to store the predictor pixels 214a, 214b, 214c from the (first) encoded frames $A_{E1}$, $B_{E1}$, $C_{E1}$ in memory (e.g., memory 112). As described herein, the encoded pixel block $C_{E1}$ and the predictor pixels 214c thereof may be considered optional for use in the second pass. In an example, the prediction module 124 may be configured to store the predictor pixels 214a, 214b, 214c from the (first) encoded frames $A_{E1}$, $B_{E1}$, $C_{E1}$ as the sequence of pixels of the one or more blocks of pixels that are neighboring another block of pixels in the memory 112. For example, in this instance, the predictor pixels 214a for encoded pixel block $A_{E1}$ may be stored in memory 112, and the predictor pixels 214b for pixel block $B_0$ may be used for intra-prediction mode selection 210 for pixel block $C_0$ stored in memory 112. Further, in this instance, the predictor pixels 214c for pixel block $C_0$ may be considered optional since there is no pixel block neighbor adjacent to pixel block $C_0$ when scanning from left to right across the input frame 202. As such, encoded pixel block $C_{E1}$ may be considered optional for use in a second pass encoding 222. In an example, memory and time may be saved by only storing the columns instead of all of the encoded pixels from the blocks.

Referring to the example of FIG. 2A, the encoder 120 may be configured to use the second pass module 126 to re-encode the input frame 202 of the uncompressed image data (e.g., blocks of pixels $A_0$, $B_0$, $C_0$, etc.) in a second pass encoding 222 using the predictor pixels 214a, 214b, 214c, etc. stored by the prediction module 124 from the first pass encoding 212 to generate (second) encoded blocks of pixels (e.g., $A_{E2}$, $B_{E2}$, $C_{E2}$, etc.). In this second pass encoding 222, a second intra-prediction mode of operation may be selected 220 by using the second pass module 126 to encode a sequence of input pixel blocks (e.g., $A_0$, $B_0$, $C_0$) of the input frame 202 in the second pass using the predictor pixels (e.g., 214a, 214b, 214c) from the first pass as part of the second intra-prediction mode selection 220 to generate the (second) encoded pixel blocks (e.g., $A_{E2}$, $B_{E2}$, $C_{E2}$, etc.) using the same or different intra-prediction modes (e.g., $M_1$, $M_2$, $M_3$ ... $M_N$). In this instance, the predictor pixels 214a for pixel block $A_0$ may be used for intra-prediction mode selection 220 for pixel block $B_0$, and the predictor pixels 214b for pixel block $B_0$ may be used for intra-prediction mode selection 220 for pixel block $C_0$.

In an implementation, referring to example of FIGS. 1-2A, the first pass module 122 of the encoder 120 may be configured to perform the first pass, and the second pass module 126 of the encoder 120 may be configured to perform the second pass. In this instance, the first and second pass modules 122, 126 may be configured to perform various image processing techniques including, for example, cropping, rotation, YCbCr conversion, intra-prediction, motion estimation 440, mode selection, differential MV coding 444, transform and quantization, and inverse transform. Further, in this implementation, the second pass module 126 may be configured to perform other various additional image processing techniques including, for example, entropy coding, bitstream forming, and deblocking filtering. Further scope and function regarding these various image processing techniques are described in greater detail herein.

Figure 2B:
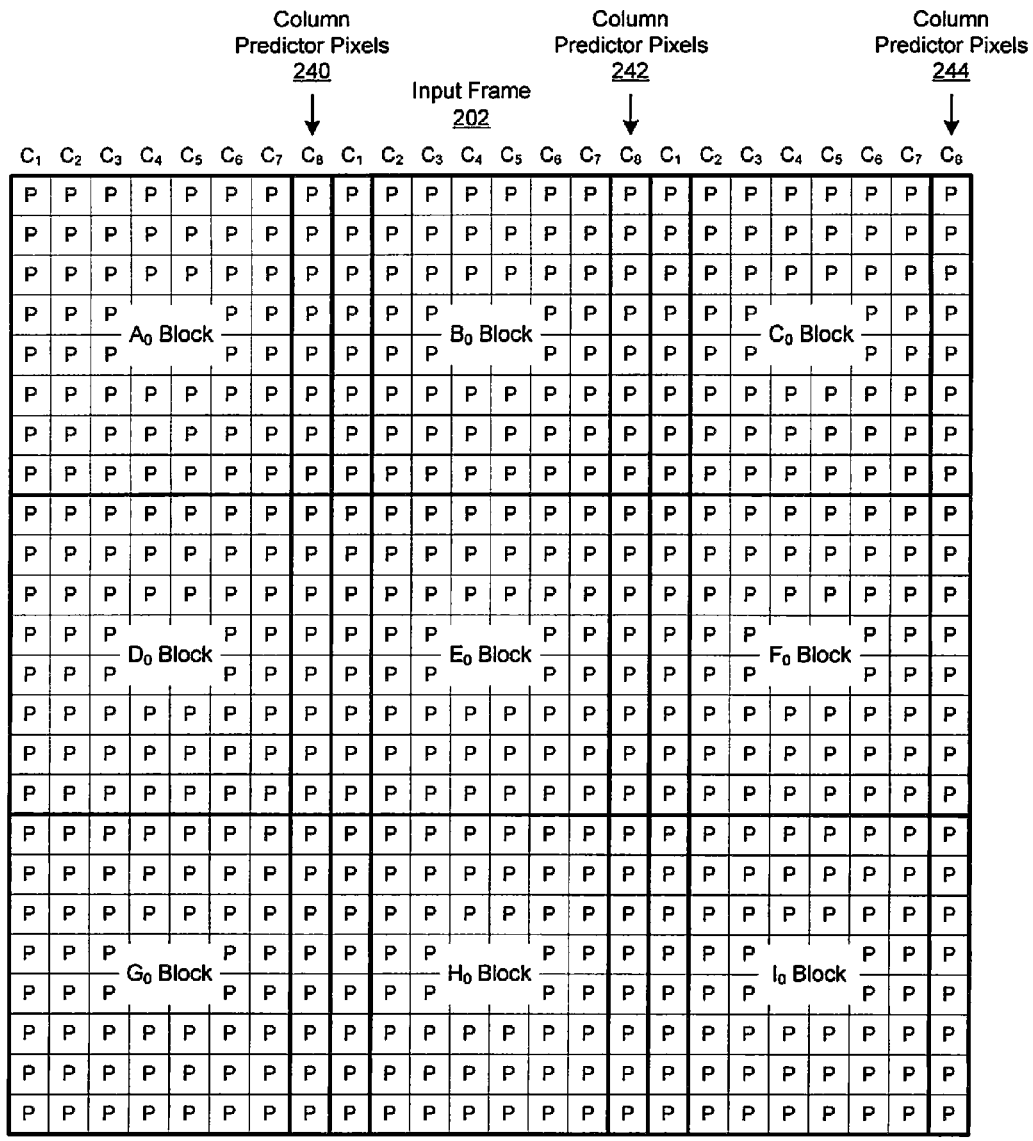
Figure 2C:
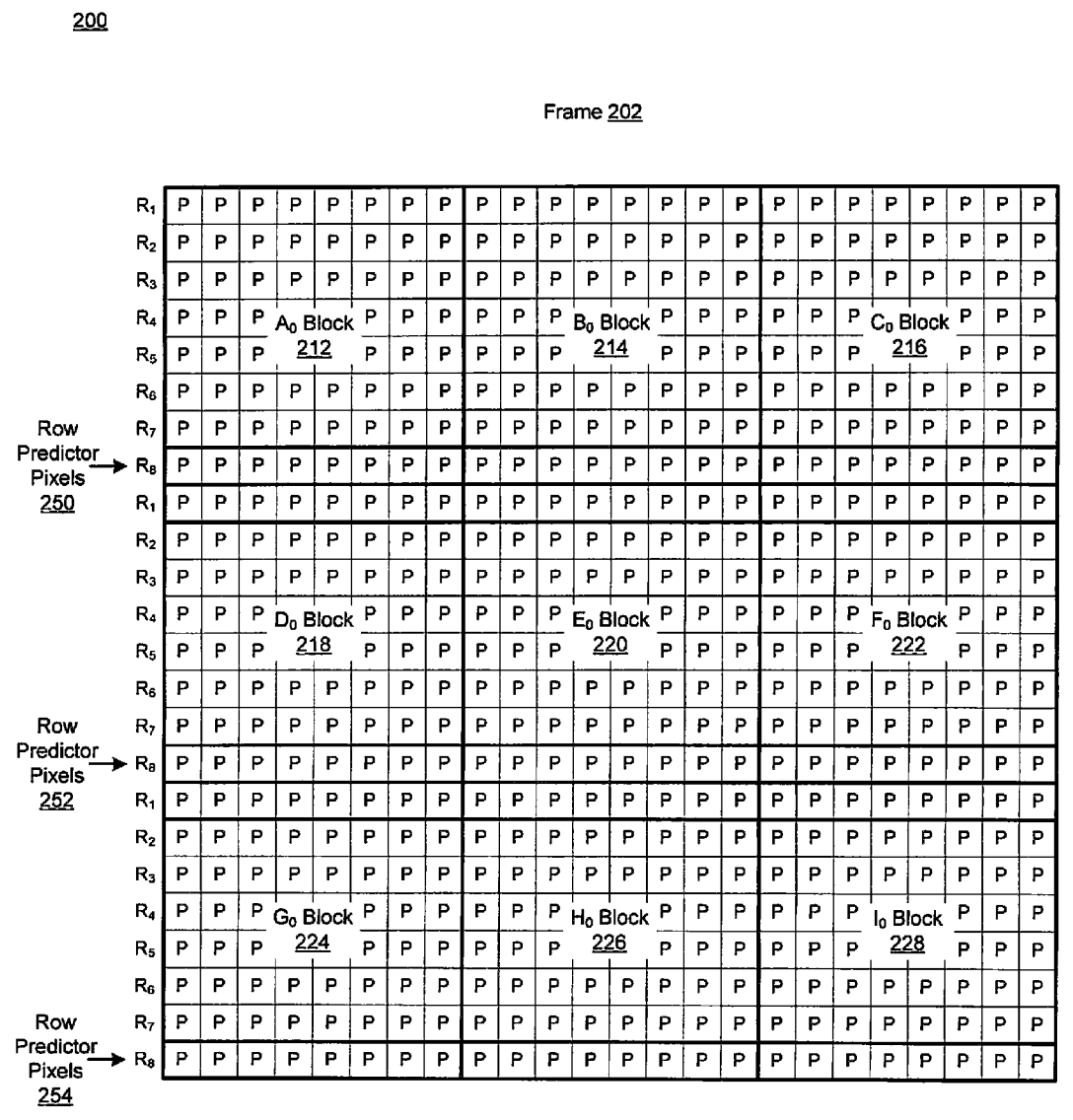

FIGS. 2B-2C are block diagrams illustrating example frames represented by blocks of pixels, in accordance with aspects of the disclosure. In particular, referring to FIG. 2B, the input frame 202 may be represented as a plurality of pixels divided into blocks of pixels (e.g., pixel blocks or macroblocks $A_0$, $B_0$, $C_0$, ..., $I_0$) having column based predictor pixels 240, 242, 244. Further, referring to FIG. 2C, the input frame 202 may be represented as a plurality of pixels divided into blocks of pixels (e.g., pixel blocks or macroblocks $A_0$, $B_0$, $C_0$, ..., $I_0$) having row based predictor pixels 250, 252, 254.

In the examples of FIGS. 2B and 2C, the input frame 200 is shown with 9 blocks of pixels ($A_0$, $B_0$, $C_0$, ..., $I_0$) divided into 8×8 non-overlapping pixels (P). In various implementations, the input frame 200 may include any number of pixels that may be divided into any number of pixel blocks, without departing from the scope of the disclosure. Further, in various examples, the blocks of pixels may include any number of pixels formed in any number of pixel blocks of any dimension, such as, for example, 2×2, 4×4, 8×8, 16×16, etc., without departing from the scope of the disclosure.

In an implementation, the blocks of pixels ($A_0$, $B_0$, $C_0$, ..., $I_0$) may be used in video compression for compressing images in motion sequences. For instance, individual frames of images (e.g., video images) may be grouped together in an image group and displayed in a manner that provides a viewer with spatial motion.

Generally, the term pixel refers to a picture element, wherein the pixel may be referred to as a single point in an image. In various examples, an image may by divided into multiple pixels (P) that may be arranged in columns and rows, wherein neighboring pixels (e.g., adjacent pixels) may be positioned close together to appear connected (to a person viewing the pixels). In some examples, shades of gray may be represented by a number of bits for the displayed pixel. For instance, an 8-bit grayscale mode may use 8 bits for color in the pixel to display 2 to the 8th power (256) different colors or shades of gray. For color display, the pixel may comprise a shade for multiple colors, such as red (R), green (G), and blue (B), wherein various colors may be represented by different combinations of RGB shades in the pixel.

Further, in the examples of FIGS. 2B and 2C, the frame or input frame 202 includes at least 9 blocks of pixels including block $A_0$, block $B_0$, block $C_0$, block $D_0$, block $E_0$, block $F_0$, block $G_0$, block $H_0$, and block $I_0$. Further, as shown in FIG. 2B, when scanning from left to right across the input frame 202, block $A_0$ neighbors block $B_0$, block $B_0$ neighbors block $C_0$, block $D_0$ neighbors block $E_0$, block $E_0$ neighbors block $F_0$, block $G_0$ neighbors block $H_0$, and block $H_0$ neighbors block $I_0$. Still further, as shown in FIG. 2C, when scanning from top to bottom across the input frame 202, block $A_0$ neighbors block $D_0$, block $D_0$ neighbors block $G_0$, block $B_0$ neighbors block $E_0$, block $E_0$ neighbors block $H_0$, block $C_0$ neighbors block $F_0$, and block $F_0$ neighbors block $I_0$.

Referring to FIG. 2B, the input frame 202 includes a plurality of pixels divided into blocks of pixels (e.g., $A_0$, $B_0$, $C_0$, ..., $I_0$) with the one or more blocks of pixels having 8 columns of pixels (e.g., $C_1$, $C_2$, $C_3$, ..., $C_8$). In an implementation, the predictor pixels may include a column of pixels 240, 242, 244 along an edge of the one or more blocks of pixels (e.g., $A_0$, $B_0$, $C_0$, ..., $I_0$) that are neighboring another block of pixels having a neighboring column of pixels (e.g., column $C_8$ of block $A_0$ neighbors column $C_1$ of block $B_0$) when scanning from left to right across the input frame 202. In this implementation, the prediction module 124 may be configured to store the predictor pixels as the column of pixels of the one or more blocks of pixels that are neighboring the another block of pixels having the neighboring column of pixels in memory 112. In some instances, column $C_8$ of blocks $C_0$, $F_0$, and $I_0$ are considered optional for memory store.

Further, referring to FIG. 2B, the predictor pixels may include a right-most column of pixels (e.g., column $C_8$) along an edge of the one or more blocks of pixels (e.g., $A_0$, $B_0$, $C_0$, ..., $I_0$) that are neighboring another block of pixels (e.g., block $B_0$ is a neighbor of block $A_0$) having a left-most neighboring column of pixels (e.g., column $C_1$) adjacent to the right-most column of pixels (e.g., column $C_8$) when scanning from left to right across the input frame 202. In this instance, the prediction module 124 may be configured to store the predictor pixels as the right-most column of pixels of the one or more blocks of pixels that are neighboring the another block of pixels having the left-most neighboring column of pixels in memory 112. In some instances, the right-most column $C_8$ of blocks $C_0$, $F_0$, and $I_0$ may be considered optional for memory store. In various other examples, instead of the right-most column of pixels being stored, any one or more of the other columns of pixels maybe stored.

Referring to FIG. 2C, the input frame 202 includes a plurality of pixels divided into blocks of pixels (e.g., $A_0$, $B_0$, $C_0$, ..., $I_0$) with the one or more blocks of pixels having 8 rows of pixels (e.g., $R_1$, $R_2$, $R_3$, ..., $R_8$). In an implementation, the predictor pixels may include a row of pixels 250, 252, 254 along an edge of the one or more blocks of pixels (e.g., $A_0$, $B_0$, $C_0$, ..., $I_0$) that are neighboring another block of pixels having a neighboring row of pixels (e.g., row $R_8$ of block $A_0$ neighbors row $R_1$ of block $D_0$) when scanning from top to bottom across the input frame 202. In this implementation, the prediction module 124 may be configured to store the predictor pixels as the row of pixels of the one or more blocks of pixels that are neighboring the another block of pixels having the neighboring row of pixels in memory 112. In some instances, the row $R_8$ of blocks $G_0$, $H_0$, and $I_0$ may be considered optional for memory store.

Further, referring to FIG. 2C, the predictor pixels may include a bottom-most row of pixels (e.g., row $R_8$) along an edge of the one or more blocks of pixels (e.g., $A_0$, $B_0$, $C_0$, ..., $I_0$) that are neighboring another block of pixels (e.g., block $D_0$ is a neighbor of block $A_0$) having a top-most neighboring row of pixels (e.g., row $R_1$) adjacent to the bottom-most row of pixels (e.g., row $R_8$) when scanning from top to bottom across the input frame 202. In this instance, the prediction module 124 may be configured to store the predictor pixels as the right-most row of pixels of the one or more blocks of pixels that are neighboring the another block of pixels having the left-most neighboring row of pixels in memory 112. In some instances, the bottom-most row $R_8$ of blocks $G_0$, $H_0$, and $I_0$ may be considered optional for memory store. In various other examples, instead of the right-most column of pixels being stored, any one or more of the other columns of pixels maybe stored.

In accordance with aspects of the disclosure, the systems and methods are provided herein for a multi-pass (e.g., a two-pass) intra-prediction mode selection for encoders, including SW and/or HW encoders. In some implementations, the systems and methods are configured to perform a first pass to store a rightmost pixel column (16 pixels tall) of the reconstructed macroblock into a separate memory buffer, wherein the store may be performed before filtering. For a last macroblock column of a macroblock row, the pixels may not be needed so they may be skipped, decreasing requirements for buffer size and bus load. When performing a second pass, the encoder may use the stored pixel values as left neighbor macroblock values when performing intra-prediction mode selection, in a manner as described herein. Inner boundaries may use pixel values from the input image (e.g., meaning that intra 4×4 prediction modes for blocks not on the upper block row or leftmost block column may be hampered). As the second pass may encode the macroblocks differently than the first pass, the result may provide a closer approximation of actual reconstructed data, especially with higher quantizers.

In some implementations, some reasons for using a separate memory area for storing the pixels may include one or more of the following. For instance, if not otherwise required, reconstructed frame output may be disabled for the first pass, saving bus load (e.g., store of 384 pixels vs. 16). In another instance, bus load may be reduced in the second pass, wherein reconstructed data of multiple macroblocks may be read with a single burst, as opposed to 16 bursts as required if the first pass reconstructed frame were to be stored in raster-scan format. In another instance, memory use may be reduced, wherein a need to allocate space for only required luminance pixels as opposed to entire reference frame. In some implementations, the technique provided herein is not format specific and may be implemented in various known encoders. In other implementations, the following elements may need to be added to the SW/HW interface: base address for storing pixel data, signal to enable writing rightmost pixels of reconstructed macroblocks to the base address, and signal to enable using the pixel data from the base address in the intra-prediction mode selection. Further, in another implementation, the SW driver may need to be updated accordingly to allocate 16* number-of-macroblocks bytes of memory for the buffer and enable the signals at correct points.

Figure 3:
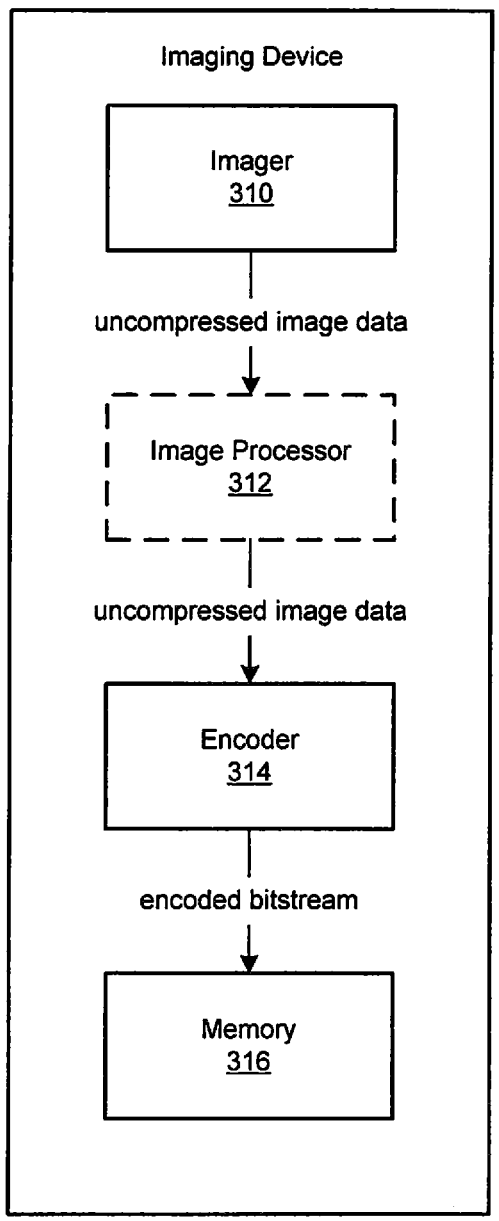
FIG. 3 is a block diagram illustrating an example imaging device for multi-pass encoding, in accordance with aspects of the disclosure.

FIG. 3 is a block diagram illustrating an example flow of an imaging device 300 for multi-pass encoding, in accordance with aspects of the disclosure.

As shown in FIG. 3, the imaging device 300 may include an imager 310, an optional image processor 312, an encoder 314, and a memory 316. In various implementations, the imaging device 300 may represent various mobile devices including mobile phones, smartphones, consumer video cameras (e.g., compact, DSLR-video, etc), security video cameras, or any device that records and stores video digitally.

The imager 310 may be configured to capture an image and generate uncompressed image data of the captured image. The imager 310 may be referred to as a camera sensor and/or an imaging sensor. The imager 310 may comprises a video imager configured to capture a plurality of sequential images and generate uncompressed image data of the sequentially captured images. In various examples, the imager 310 may be configured to capture one or more images and generate uncompressed image data of the captured images. The imager 310 may comprise any device that converts an optical image into an electronic signal. For instance, the imager 310 may comprise a video camera configured to capture a plurality of sequential images and generate uncompressed image data of the sequentially captured images.

The encoder 314 may be configured to receive the uncompressed image data directly from the imager 310, store an encoded bitstream of the uncompressed image data in a first memory area of the memory 316, and perform a multi-pass encoding of the uncompressed image data. The encoder 314 may include a first pass module configured to encode a frame of the uncompressed image data in a first pass. The encoder 314 may include a prediction module configured to store an encoded bitstream of predictor pixels from the encoded frame in a second memory area of the memory 316 that is separate from the first memory area. The predictor pixels may include neighboring pixels of the pixel in the frame, and the prediction module may be further configured to store the neighboring pixels in the first memory area of the memory 316. The encoder 314 may include a second pass module configured to re-encode the frame of the uncompressed image data in a second pass using the predictor pixels stored by the prediction module from the first pass.

In an implementation, referring to the example of FIG. 3, the optional image processor 312 may be configured to receive image signals from the imager 310, process the received image signals (e.g., to provide processed image data), and provide the image signals and/or the image data to the encoder 314.

Figure 4:
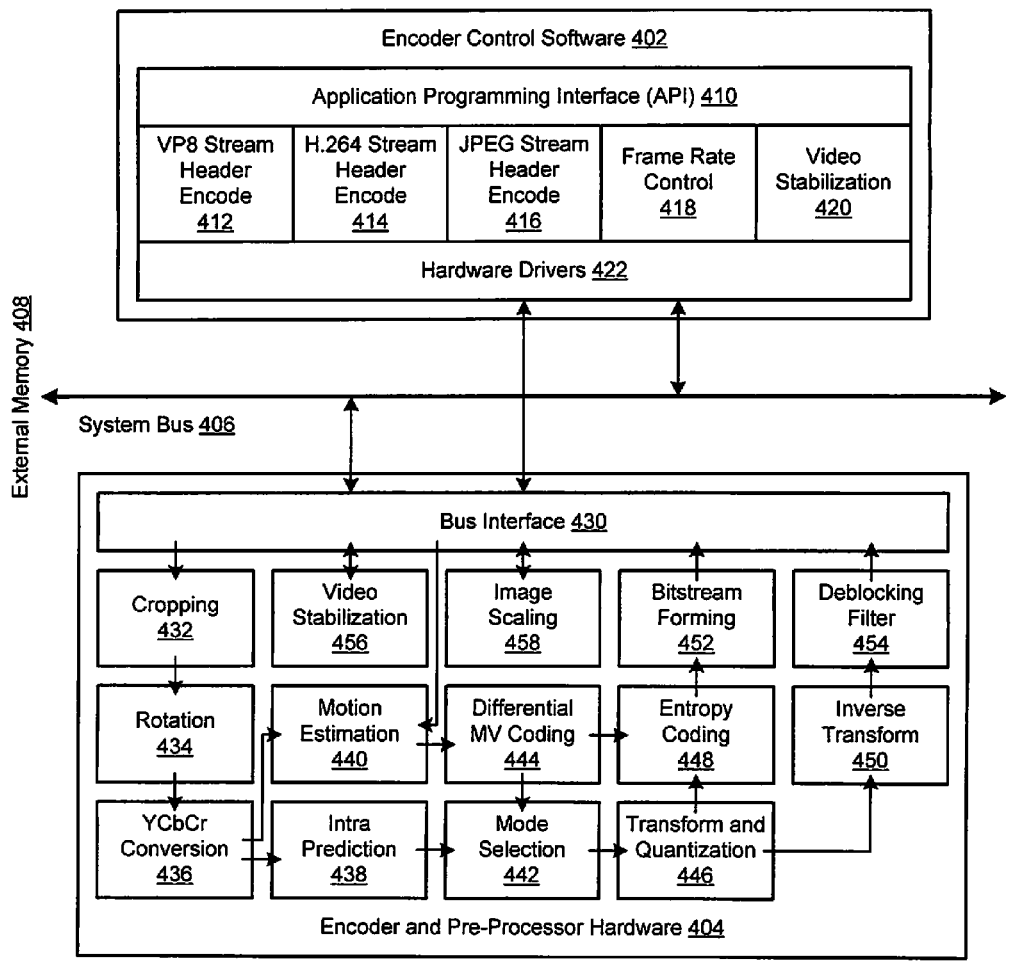
FIG. 4 is a block diagram illustrating an example encoder system for multi-pass encoding, in accordance with aspects of the disclosure.

FIG. 4 is a block diagram illustrating an example encoder system 400 for multi-pass encoding, in accordance with aspects of the disclosure. As shown in FIG. 4, the block diagram reveals an approximate architecture and data flow for the HW of the encoder system 400. Aspects of the disclosure are related to an intra-prediction module 438, which is described in greater detail herein.

In the example of FIG. 4, the encoder system 400 may include encoder control software 402, encoder and pre-processor hardware 404, and a system bus 406 in communication with external memory 408, such as the storage mediums 112, 162.

The encoder control software 402 may include an application programming interface (API) module 410, a VP8 stream header encode module 412, an H.264 stream header encode module 414, a JPEG stream header encode module 416, a video bitrate control module 418, a video stabilization module 420, and a hardware drivers module 422.

The application programming interface (API) 410 may comprise a specification for use as a communication interface between software modules. In some example, the API 410 may include specifications for routines, data structures, object classes, and variables.

The VP8 stream header encode module 412 may be configured for encoding data for VP8, which is an open video compression format representing a specification for digitally representing a video as a file or a bitstream.

The H.264 stream header encode module 414 may be configured for encoding data for H.264/MPEG-4 Part 10 or AVC (Advanced Video Coding), which is a standard for video compression and is currently used for recording, compression, and distribution of high definition (HD) video.

The JPEG stream header encode module 416 may be configured for encoding data for JPEG, which is a commonly used method for digital image compression.

The video bitrate control module 418 may be configured for video bitrate control (VBC), which is a technique for achieving higher color quality in low color resolution display panels, wherein a dithering technique that combines adjacent pixels to simulate a desired shade. For instance, VBC may be referred to as a form of temporal dithering that cycles between different color shades with the new frame to simulate an intermediate shade. In some examples, rate control may be used to adjust compression (i.e., bitrate) on a frame-by-frame basis, while frame rate may remain unchanged.

The video stabilization module 420 may be configured for image stabilization (IS), which is a family of techniques used to reduce blurring and jitter associated with camera motion during exposure to compensate for angular movement of a camera or other imaging device. In still cameras, camera jitter may be considered problematic with slow shutter speeds or with long focal length lenses. In video cameras, camera jitter may cause visible frame-to-frame shaking in recorded videos.

The hardware drivers module 422 may be configured for assisting a computer program to allow higher-level software programs to interact with hardware devices. For instance, the hardware driver 422 may be configured to communicate with the encoder and preprocessor hardware 404 through the system bus 406. When the API 410 calls a routine, the hardware driver 422 provides commands to the encoder and preprocessor hardware 404. Once the encoder and preprocessor hardware 404 sends data back, the hardware driver 422 provides routines to the API 410. The hardware drivers 422 may be considered hardware-dependent and operating-system-specific.

The encoder and pre-processor hardware 404 may include a bus interface 430 in communication with the system bus 406 and a plurality of hardware modules including a cropping module 432, a rotation module 434, a YCbCr conversion module 436, the intra-prediction module 438, a motion estimation module 440, a mode selection module 442, a differential MV coding module 444, a transform and quantization module 446, an entropy coding module 448, an inverse transform module 450, a bitstream forming module 452, a deblocking filter module 454, a video stabilization module 456, and an image scaling module 458.

The cropping module 432 may be configured for cropping an image, which may refer to removal of a portion (e.g., a peripheral portion) of an image to improve framing, accentuate subject matter, and/or change aspect ratio. In an example, cropping of the image may be performed digitally using image editing hardware and/or software.

The rotation module 434 may be configured for rotating an image, which may refer to rotating an orientation of an image (e.g., degree rotation of an image clockwise or counter-clockwise with respect to a pivot point or region, such as a central point or region of the image) to improve positioning of the image in reference to a viewing angle. In an example, degree rotation of the image may include movement between ±90° orientations, such as rotating between portrait and landscape positions. In another example, rotation of the image may be performed digitally using image editing hardware and/or software.

The YCbCr conversion module 436 may be configured for encoding RGB information in an image color space. In an example, actual color displayed may depend on actual RGB primaries to display an image signal. As such, YCbCr expressed values may be predictable in reference standard RGB chroma components. Generally, YCbCr refers to a family of color spaces used for color image pipelines in video and digital photography systems, wherein Y is a luma component, Cb is a blue-difference chroma component, and Cr is a red-difference chroma component.

The intra-prediction module 438 may be configured for multi-pass (e.g., a two-pass) intra-prediction mode selection for encoders, including encoding software (SW) and/or encoding hardware (HW). In an implementation, a first pass may be used to encode and store an entire frame as-is. Next, for the macroblock, left predictor pixels may be stored in a separate memory area. Then, a second pass may be used to encode the entire frame again. As a result of using this technique, the intra-prediction module 438 may be supplied with reconstructed predictor pixels from the first pass to use in intra-prediction mode selection. The intra-prediction module 438 is configured to provide an improved approximation of actual predictors (or at least better than using the input frame) to reduce visual artifacts and improve compression efficiency. In some implementations, more calculations and data may be collected from the first pass to improve compression efficiency and visual quality.

The motion estimation module 440 may be configured for motion estimation of sequential images, which may refer to determining motion vectors transforming adjacent 2D images in a video sequence. Generally, the motion vectors may relate to a whole image frame (global motion estimation) or specific parts within an image frame, such as rectangular blocks, arbitrary shaped patches, or per pixel. Further, the motion vectors may be represented by a translational model or any other model that may approximate motion of a video, such as rotation and translation in all relevant dimensions including zoom.

The mode selection module 442 may be configured for selecting an intra-prediction mode of operation to re-encode a frame of uncompressed image data in the second pass using the predictor pixels from the first pass as part of the intra-prediction mode selection. As a result of using this multi-pass encoding technique, predictor pixels from the first pass may be used in intra-prediction mode selection.

The differential MV coding module 444 may be configured for encoding motion vectors of pixels in the macroblock. In reference to video compression, a motion vector (MV) is an element for motion estimation and may represent a macroblock of an image based on a position of the macroblock in a reference image. Generally, motion vectors for chrominance blocks may be derived by dividing component values of the macroblock vector in half, due to the chrominance format. The macroblock vector may be obtained by adding predictors to vector differences indicated by motion vectors.

The transform and quantization module 446 may be configured for modifying small differences in brightness over an image area by modifying the strength of high frequency brightness variations of the image. In an example, this modification may be used to reduce an amount of high frequency information by dividing the component in the frequency domain by a constant and then rounding to a nearest integer.

The entropy coding module 448 may be configured for entropy encoding image data, which uses a lossless data compression scheme that is independent of characteristics of the medium. In an example, entropy coding may be used to create and assign a unique prefix-free code to the unique symbol in an input, and data may be compressed by replacing the fixed-length input symbol by the corresponding variable-length prefix-free output codeword. Generally, the codeword length is approximately proportional to the negative logarithm of the probability, wherein common symbols use short codes. Some common entropy encoding techniques include Huffman coding and arithmetic coding.

The inverse transform module 450 may be configured for inverse transform sampling, which may be referred to as pseudo-random number sampling, to generate sample numbers at random from any probability distribution given its cumulative distribution function. In an example, computing the cumulative distribution function of the distribution (which maps a number in the domain to a probability between 0 and 1) and then inverting that function is the source of the term inverse or inversion.

The bitstream forming module 452 may be configured for forming a bitstream as a timed series of bits or as a sequence of bits. Generally, bitstreams may be used in computing for synchronous transport of data between computing devices.

The deblocking filter module 454 may be configured for applying a video filter to blocks in decoded video to improve visual quality and improve prediction performance by smoothing sharp edges of images that may form between macroblocks during block coding. Generally, the deblocking filter is used for appearance improvements to decoded pictures and is part of the H.264 codec specification.

The video stabilization module 456 may be configured for stabilizing images in sequential images of a video and may be used to reduce blurring associated with motion between sequential images captured by an imaging device by compensating for angular movement (e.g., pan, tilt, yaw, pitch, etc.) of the imaging device. For instance, referring to still cameras, camera shake may be particularly problematic at slow shutter speeds or with long focal length lenses. In another instance, referring to video cameras, camera shake causes visible frame-to-frame jitter in a recorded video.

The image scaling module 458 may be configured for scaling an image, which may include, for example, resizing a digital image. Generally, scaling may involve a trade-off between efficiency, smoothness, and sharpness. For instance, when image size is increased, the pixels in the image may become increasingly visible so as to make the image appear soft. In another instance, reducing image size may enhance or sharpen a smoothness of the image.

In an implementation, referring to example of FIG. 1, the first pass module 122 of the encoder 120 (e.g., which may include the encoder 404 of FIG. 4) may be configured to perform the first pass, and the second pass module 126 of the encoder 120 (e.g., which may include the encoder 404 of FIG. 4) may be configured to perform the second pass. In this implementation, the first pass module 122 may be configured to use and/or implement modules 432, 434, 436, 438, 440, 442, 444, 446, and 450, and the second pass module 126 may be configured to use and/or implement modules 432, 434, 436, 438, 440, 442, 444, 446, 448, 450, 452 and 454. Accordingly, the first pass module 122 may be considered similar to the second pass module 126, except the first pass module 122 may not be configured to use and/or implement the entropy coding module 448, the bitstream forming module 452, and the deblocking filter module 454. As such, in this implementation, the second pass module 126 may be configured to use and/or implement the entropy coding module 448, the bitstream forming module 452, and the deblocking filter module 454.

For instance, the deblocking filter module 454 may be omitted from the first pass module 122 in that intra-prediction as implemented in either VP8 or H.264 may use pixel values prior to deblocking filtering. In this instance, the pixel values that may be stored by the prediction module 124 may also be used as the pixel values prior to the deblocking filtering, and since the output frame may be scrapped, the deblocking filter module 454 may be skipped.

Figure 5:
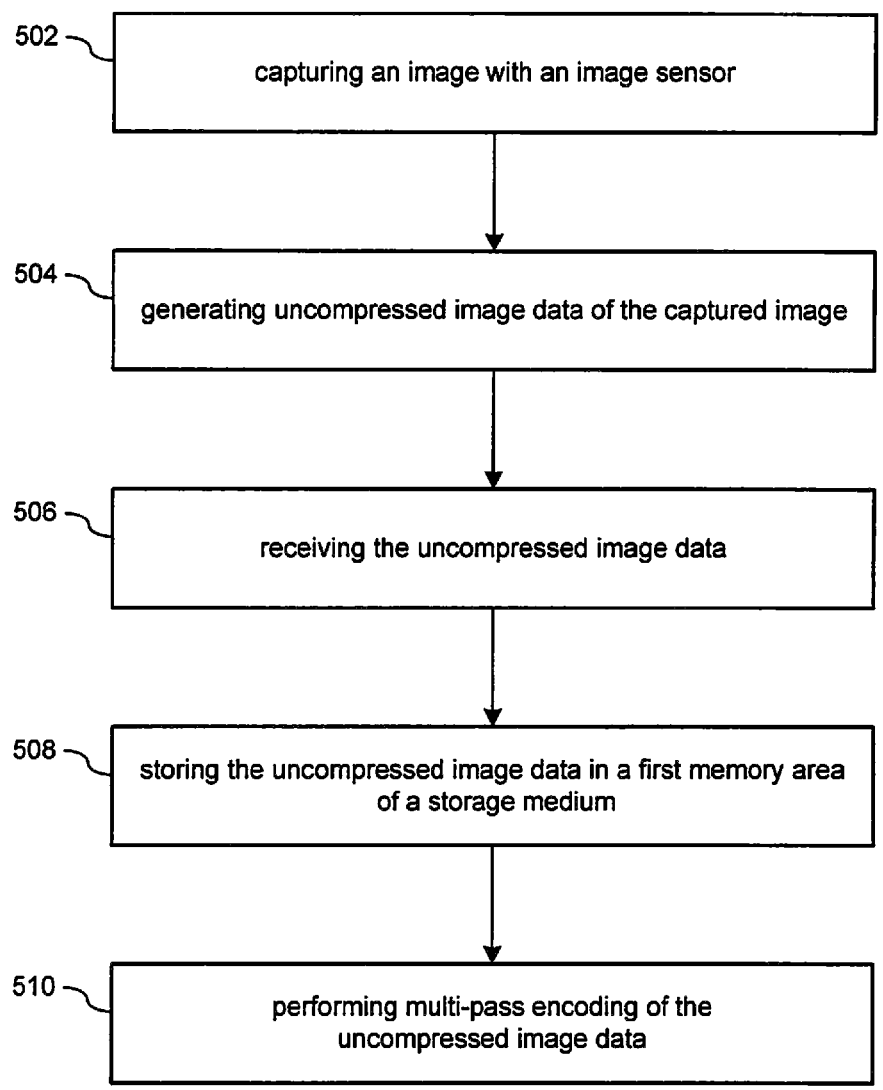
FIG. 5 is a process flow illustrating an example method for multi-pass encoding, in accordance with aspects of the disclosure.

FIG. 5 is a process flow illustrating an example method 500 for multi-pass encoding, in accordance with aspects of the disclosure.

In the example of FIG. 5, operations 502-508 are illustrated as discrete operations occurring in sequential order. However, in other implementations, two or more of the operations 502-508 may occur in a partially or completely overlapping or parallel manner, or in a nested or looped manner, or may occur in a different order than that shown. Further, one or more additional operations, that may not be specifically illustrated in the example of FIG. 5, may also be included in some implementations, while in other implementations, one or more of the operations 502-508 may be considered optional or omitted.

In the example of FIG. 5, at 502, the method 500 may include capturing an image with an image sensor (e.g., the imaging sensor 114 or the imager 214). In an implementation, the imaging sensor may comprise a video camera configured to capture a plurality of sequential images (e.g., a video stream) and generate uncompressed image data of the sequentially captured images. At 504, the method 500 may include generating uncompressed image data of the captured image. At 506, the method 500 may include receiving the uncompressed image data from the image sensor. At 508, the method 500 may include storing the uncompressed image data in a first memory area of a storage medium. At 510, the method 500 may include performing a multi-pass encoding of the uncompressed image data, which is further described in FIG. 6.

Figure 6:
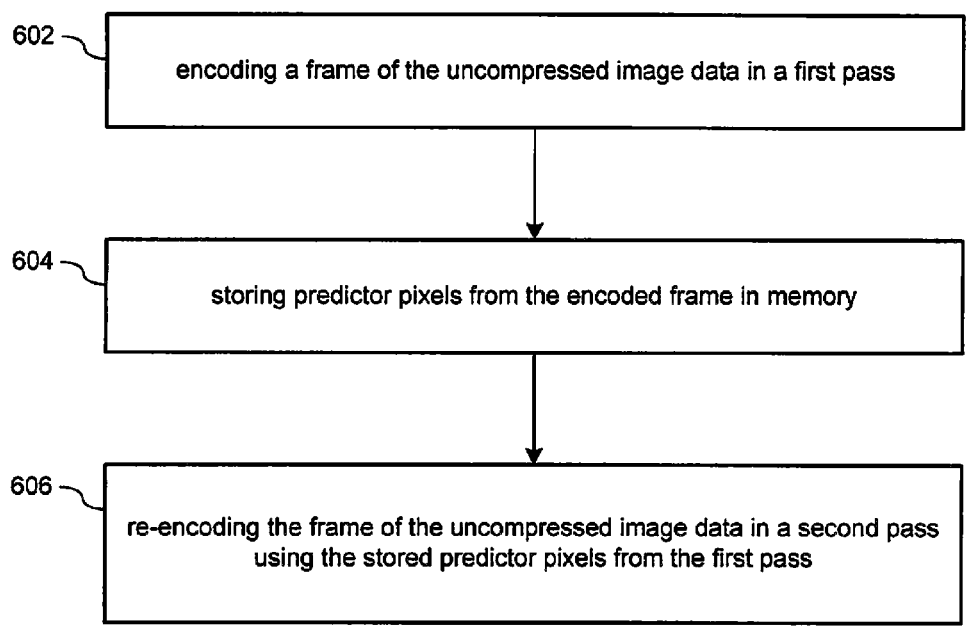
FIG. 6 is a process flow illustrating another example method for multi-pass encoding, in accordance with aspects of the disclosure.

FIG. 6 is a process flow illustrating another example method 600 for multi-pass encoding, in accordance with aspects of the disclosure.

In the example of FIG. 6, operations 602-606 are illustrated as discrete operations occurring in sequential order. However, in other implementations, two or more of the operations 602-606 may occur in a partially or completely overlapping or parallel manner, or in a nested or looped manner, or may occur in a different order than that shown. Further, one or more additional operations, that may not be specifically illustrated in the example of FIG. 6, may also be included in some implementations, while, in other implementations, one or more of the operations 602-606 may be considered optional or omitted.

In the example of FIG. 6, at 602, the method 600 may include encoding a frame of the uncompressed image data in a first pass. In an example, the frame may include at least one frame from a plurality of frames including a plurality of sequential frames. In another example, the frame may include an entire frame, and the entire frame may be encoded of the uncompressed image data.

At 604, the method 600 may include storing predictor pixels from the encoded frame in a memory. In an example, the frame may include a plurality of pixels divided into blocks of pixels, wherein the predictor pixels include a sequence of pixels along an edge of the one or more blocks of pixels that are neighboring another block of pixels, and the predictor pixels may be stored as the sequence of pixels of the one or more blocks of pixels that are neighboring another block of pixels in the memory.

At 606, the method 600 may include re-encoding the frame of the uncompressed image data in a second pass using the stored predictor pixels from the first pass. In an example, a first intra-prediction mode of operation may be selected by using the first pass module to encode the frame of the uncompressed image data in the first pass using the predictor pixels from the first pass as part of the first intra-prediction mode selection. In another example, a second intra-prediction mode of operation may be selected by using the second pass module to re-encode the frame of the uncompressed image data in the second pass using the predictor pixels from the first pass as part of the intra-prediction mode selection.

In an example, the method 500 may further include displaying at least one of the uncompressed image data of the captured image, the frame of the image data encoded in the first pass, and the frame of the encoded image data of the second pass.

Figure 7:
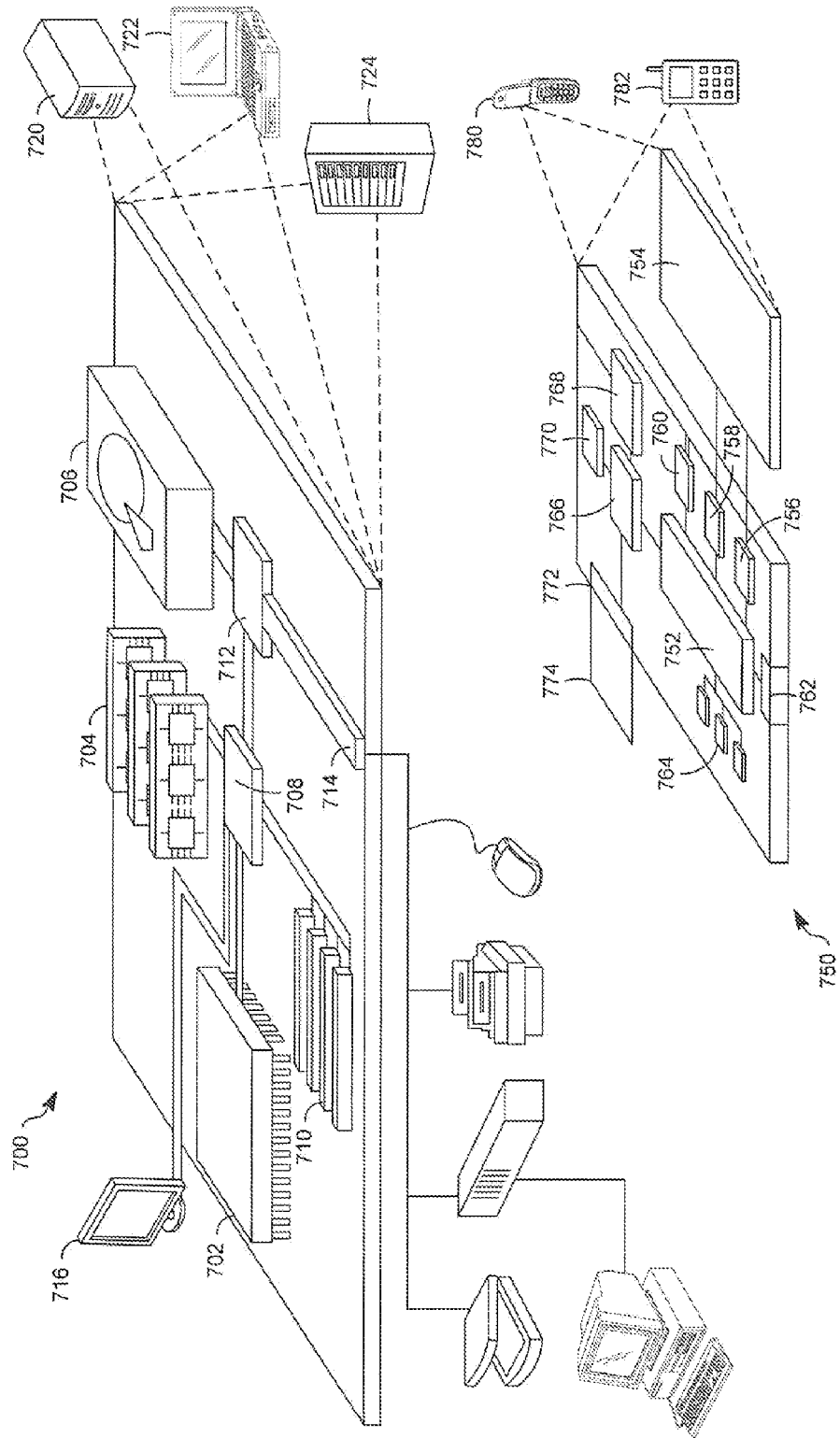
FIG. 7 is a block diagram illustrating example or representative computing devices and associated elements that may be used to implement one or more systems and methods of FIGS. 1-6, in accordance with aspects of the disclosure.

FIG. 7 is a block diagram illustrating example or representative computing devices and associated elements that may be used to implement one or more systems and methods of FIGS. 1-6, in accordance with aspects of the disclosure.

In an implementation, FIG. 7 shows an example of a computer device 700 and a mobile computer device 750 (e.g., mobile communication device including a low-power mobile communication device, such as, for example, mobile phone, cellular phone, etc.), which may be used in accordance with aspects, methods, and techniques, as described and provided herein. The computing device 700 may represent various forms of digital computers, such as personal computers, laptops, tablets, desktops, workstations, personal digital assistants, servers, blade servers, mainframes, and other appropriate computers. The computing device 750 may represent various forms of mobile devices, such as personal digital assistants, cellular telephones, smart phones, and other similar computing devices. The components shown herein, their connections and relationships, and their functions, are meant to be exemplary only, and are not meant to limit implementations described herein and/or claimed in this disclosure.

The computing device 700 may include one or more processors 702, memory 704, a storage device 706, a high-speed interface 708 connecting to memory 704 and high-speed expansion ports 710, and a low speed interface 712 connecting to low speed bus 714 and storage device 706. One or more of the components 702, 704, 706, 708, 710, and 712, are interconnected using various busses, and may be mounted on a common motherboard or in other manners as appropriate. In an implementation, the processor 702 may be configured to process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be utilized, as appropriate, along with multiple memories and types of memory. Further, multiple computing devices 700 may be connected, with the device providing portions of the necessary operations (e.g., as a server bank, a group of blade servers, or a multi-processor system).

The memory 704 may be configured to store information within the computing device 700. In an implementation, the memory 704 may comprise one or more volatile memory units. In another implementation, the memory 704 may comprise one or more non-volatile memory units. The memory 704 may comprise another form of non-transitory computer-readable medium, such as a magnetic or optical disk.

The storage device 706 may be configured for providing mass storage for the computing device 700. In an implementation, the storage device 706 may comprise a non-transitory computer-readable medium, such as a floppy disk device, a hard disk device, an optical disk device, or a tape device, a flash memory, or other similar solid state memory device, or an array of devices, including devices configured for use in a storage area network or various other configurations. In some implementations, a computer program product may be tangibly embodied in an information carrier. The computer program product may include instructions that, when executed, perform one or more methods, such as those described herein. In another implementation, the information carrier may comprise a non-transitory computer-readable medium or a non-transitory machine-readable medium, such as the memory 704, the storage device 706, or memory on the processor 702.

The high speed controller 708 may be configured to manage bandwidth-intensive operations for the computing device 700, while the low speed controller 712 may be configured to manage lower bandwidth-intensive operations. Such allocation of functions may be exemplary only. In an implementation, the high-speed controller 708 may be coupled to the memory 704, the display 716 (e.g., through a graphics processor or accelerator), and/or to the high-speed expansion ports 710, which may be configured to accept various expansion cards (not shown). In the implementation, low-speed controller 712 may be coupled to the storage device 706 and/or the low-speed expansion port 714, wherein the low-speed expansion port, which may include various communication ports (e.g., USB, Bluetooth, Ethernet, wireless Ethernet, etc.) may be coupled to one or more input/output devices, such as a keyboard, a pointing device, a scanner, or a networking device, such as a switch or router, e.g., through a network adapter.

The computing device 700 may be implemented in a number of different forms, in a manner as shown in FIG. 7. For example, the computing device 700 may be implemented as a standard server 720, or multiple times in a group of such servers. The computing device 700 may be implemented as part of a rack server system 724. In addition, the computing device 700 may be implemented in a personal computer (PC), such as a laptop computer 722. In another implementation, components from the computing device 700 may be combined with other components in a mobile device (not shown), such as device 750. One or more of such devices may include one or more of computing devices 700, 750, and an entire system may be made up of multiple computing devices 700, 750 communicating with one another.

The computing device 750 may include one or more processors 752, memory 764, an input/output device, such as a display 754, a communication interface 766, and a transceiver 768, among various other components. The device 750 may be provided with a storage device, such as a micro-drive or some other related device, to provide additional storage. One or more of the components 750, 752, 764, 754, 766, and 768 may be interconnected using various buses, and several of the components may be mounted on a common motherboard or in other manners as appropriate.

The processor 752 may be configured to execute instructions within the computing device 750, including instructions stored in the memory 764. The processor 752 may be implemented as a chipset of chips that include separate and multiple analog and digital processors. In an implementation, the processor 752 may provide for coordination of the other components of the device 750, such as control of user interfaces, applications run by device 750, and wireless communication by device 750.

The processor 752 may be configured to communicate with a user through a control interface 758 and a display interface 756 coupled to a display 754. The display 754 may comprise, for example, a TFT LCD (Thin-Film-Transistor Liquid Crystal Display) or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In an implementation, an external interface 762 may be provide in communication with the processor 752 to enable near area communication of device 750 with various other devices. In an example, the external interface 762 may provide for wired communication in some implementations, or for wireless communication in other implementations, and multiple interfaces may be utilized.

The memory 764 may be configured to store information within the computing device 750. The memory 764 may be implemented as one or more of a non-transitory computer-readable medium or media, one or more volatile memory units, or one or more non-volatile memory units. Expansion memory 774 may be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, in an example, expansion memory 774 may include instructions to carry out or supplement the processes described above, and may include secure information. Thus, for example, the expansion memory 774 may be provide as a security module for device 750, and may be programmed with instructions that permit secure use of device 750. Further, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752, that may be received, for example, over transceiver 768 or external interface 762.

The device 750 may be configured to communicate wirelessly through communication interface 766, which may include digital signal processing circuitry where necessary. In an implementation, a communication interface 766 may provide for communications under various modes or protocols, such as GSM voice calls, SMS, EMS, or MMS messaging, CDMA, TDMA, PDC, WCDMA, CDMA2000, or GPRS, among others. In an example, such communication may occur, for example, through a radio-frequency transceiver 768. Further, short-range communication may occur, such as using a Bluetooth, WiFi, or other such transceiver (not shown). Still further, a GPS (Global Positioning System) receiver module 770 may provide additional navigation- and/or location-related wireless data to device 750, which may be used as appropriate by applications running on device 750.

The device 750 may be configured to communicate audibly using audio codec 760, which may receive spoken information from a user and convert it to usable digital information. In an example, an audio codec 760 may likewise generate audible sound for a user, such as through a speaker, e.g., in a handset of the device 750. In various implementations, such sound may include sound from voice telephone calls, may include recorded sound (e.g., voice messages, music files, etc.) and may include sound generated by applications operating on the device 750.

The computing device 750 may be implemented in a number of different forms, in a manner as shown in FIG. 7. For example, the computing device 750 may be implemented as a mobile communication device 780 including a cellular telephone and/or some other low power mobile communication devices. In another example, the computing device 750 may be implemented as part of a smart phone 782, personal digital assistant, or some other similar mobile device.

As such, various implementations of the systems, methods, and techniques described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a non-transitory machine-readable medium that is configured to receive machine instructions as a machine-readable signal. In various examples, the term "machine-readable signal" may refer to any signal used to provide machine instructions and/or data to a programmable processor.

In an implementation, to provide for interaction with a user, the systems, methods, and techniques described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other types of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

In various examples, the systems, methods, and techniques as described herein may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems, methods, and techniques described here), or any combination of such back end, middleware, or front end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from one another and typically interact through a communication network. The relationship of client and server arises by virtue of computer programs running on the respective computers and having a client-server relationship to one another.

Further, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

The above embodiments that have been described in particular detail are merely example or possible embodiments, and that there are many other combinations, additions, or alternatives that may be included.

The particular naming of the components, capitalization of terms, the attributes, data structures, or any other programming or structural aspect is not mandatory or significant, and the mechanisms that may be used to implement aspects of the disclosure or its features may have different names, formats, or protocols. Further, the system may be implemented via a combination of hardware and software, as described, or entirely in hardware elements. Further, any particular division of functionality between the various system components described herein is merely exemplary, and not mandatory; functions performed by a single system component may instead be performed by multiple components, and functions performed by multiple components may instead performed by a single component.

In accordance with aspects of the disclosure, some portions of above description present features in terms of algorithms and symbolic representations of operations on information. These algorithmic descriptions and representations may be used by those skilled in the data processing arts to most effectively convey the substance of their work to others skilled in the art. These operations, while described functionally or logically, are understood to be implemented by computer programs. Moreover, it has also proven convenient at times, to refer to these arrangements of operations as modules or by functional names, without loss of generality.

Unless specifically stated otherwise as apparent from the above discussion, throughout the description, discussions utilizing terms such as "processing" or "computing" or "calculating" or "determining" or "displaying" or "providing" or the like, refer to the action and processes of a computer system, or similar electronic computing device, that manipulates and transforms data represented as physical (electronic) quantities within the computer system memories or registers or other such information storage, transmission or display devices.

What is claimed is:

1. A device comprising:
   a memory; and
   an encoder configured to receive uncompressed image data and perform multi-pass encoding of the uncompressed image data, the encoder including:
      a first pass module configured to encode a frame of the uncompressed image data in a first pass,
      a prediction module configured to store predictor pixels from the encoded frame in the memory, and
      a second pass module configured to re-encode the frame of the uncompressed image data in a second pass using the predictor pixels stored by the prediction module from the first pass.

2. The device of claim 1, wherein the frame includes at least one frame from a plurality of frames including a plurality of sequential frames.

3. The device of claim 1, wherein:
   the frame includes an entire frame, and
   the first pass module is configured to encode the entire frame of the uncompressed image data.

4. The device of claim 1, wherein:
   the frame includes a plurality of pixels divided into blocks of pixels,
   the predictor pixels include a sequence of pixels along an edge of the one or more blocks of pixels that are neighboring another block of pixels, and
   the prediction module is configured to store the predictor pixels as the sequence of pixels of the one or more blocks of pixels that are neighboring another block of pixels in the memory.

5. The device of claim 1, wherein:
   the frame includes a plurality of pixels divided into blocks of pixels with the one or more blocks of pixels having columns of pixels,
   the predictor pixels include a column of pixels along an edge of the one or more blocks of pixels that are neighboring another block of pixels having a neighboring column of pixels, and
   the prediction module is configured to store the predictor pixels as the column of pixels of the one or more blocks of pixels that are neighboring the another block of pixels having the neighboring column of pixels in the memory.

6. The device of claim 1, wherein:
   the frame includes a plurality of pixels divided into blocks of pixels with the one or more blocks of pixels having columns of pixels,
   the predictor pixels include a right-most column of pixels along an edge of the one or more blocks of pixels that are neighboring another block of pixels having a left-most neighboring column of pixels adjacent to the right-most column of pixels, and the prediction module is configured to store the predictor pixels as the right-most column of pixels of the one or more blocks of pixels that are neighboring the another block of pixels having the left-most neighboring column of pixels in the memory.

7. The device of claim 1, wherein:

the frame includes a plurality of pixels divided into blocks of pixels with the one or more blocks of pixels having rows of pixels, the predictor pixels include a row of pixels along an edge of the one or more blocks of pixels that are neighboring another block of pixels having a neighboring row of pixels, and the prediction module is configured to store the predictor pixels as the row of pixels of the one or more blocks of pixels that are neighboring the another block of pixels having the neighboring row of pixels in the memory.

8. The device of claim 1, wherein:

the frame includes a plurality of pixels divided into blocks of pixels with the one or more blocks of pixels having rows of pixels, the predictor pixels include a bottom-most row of pixels along an edge of the one or more blocks of pixels that are neighboring another block of pixels having a top-most neighboring row of pixels adjacent to the bottom-most row of pixels, and the prediction module is configured to store the predictor pixels as the bottom-most row of pixels of the one or more blocks of pixels that are neighboring the another block of pixels having the top-most neighboring row of pixels in the memory.

9. The device of claim 1, wherein the encoder is further configured to:

select an intra-prediction mode of operation by using the second pass module to re-encode the frame of the uncompressed image data in the second pass using the predictor pixels from the first pass as part of the intra-prediction mode selection.

10. The device of claim 1, wherein the encoder is further configured to:

select a first intra-prediction mode of operation by using the first pass module to encode the frame of the uncompressed image data in the first pass using the predictor pixels from the first pass as part of the first intra-prediction mode selection, and select a second intra-prediction mode of operation by using the second pass module to re-encode the frame of the uncompressed image data in the second pass using the predictor pixels from the first pass as part of the intra-prediction mode selection.

11. The device of claim 1, further including:

an imager configured to capture an image and generate uncompressed image data of the captured image, wherein:

the encoder is configured to receive the uncompressed image data from the imager and store the uncompressed image data in a first area of the memory, and the prediction module is configured to store the predictor pixels from the encoded frame in a second area of the memory that is separate from the first area.

12. The device of claim 1, further including:

an imager configured to capture an image and generate uncompressed image data of the captured image; and at least one processor configured to receive the uncompressed image data from the imager and provide the encoder with the uncompressed image data.

13. The device of claim 1, further including:

an imager including a video camera configured to capture a plurality of sequential images and generate uncompressed image data of the sequentially captured images.

14. The device of claim 1, further including:

a display configured to display at least one of the uncompressed image data of the captured image, the frame of the image data encoded in the first pass, and the frame of the encoded image data of the second pass.

15. A method comprising:

receiving uncompressed image data at an encoder; and performing multi-pass encoding of the uncompressed image data at the encoder, including:

encoding a frame of the uncompressed image data in a first pass, storing predictor pixels from the encoded frame in a memory, and re-encoding the frame of the uncompressed image data in a second pass using the stored predictor pixels from the first pass.

16. The method of claim 15, wherein:

the frame includes a plurality of pixels divided into blocks of pixels, the predictor pixels include a sequence of pixels along an edge of the one or more blocks of pixels that are neighboring another block of pixels, and the predictor pixels are stored as the sequence of pixels of the one or more blocks of pixels that are neighboring another block of pixels in the memory.

17. The method of claim 15, wherein performing multi-pass encoding of the uncompressed image data further includes:

selecting an intra-prediction mode of operation by re-encoding the frame of the uncompressed image data in the second pass using the predictor pixels from the first pass as part of the intra-prediction mode selection.

18. The method of claim 15, wherein performing multi-pass encoding of the uncompressed image data further includes:

selecting a first intra-prediction mode of operation by encoding the frame of the uncompressed image data in the first pass using the predictor pixels from the first pass as part of the first intra-prediction mode selection, and selecting a second intra-prediction mode of operation by re-encoding the frame of the uncompressed image data in the second pass using the predictor pixels from the first pass as part of the intra-prediction mode selection.

19. The method of claim 15, further including:

capturing an image and generating the uncompressed image data of the captured image at an imager;

receiving the uncompressed image data at the encoder from the imager and storing the uncompressed image data in a first area of the memory; and storing the predictor pixels from the encoded frame in a second area of the memory that is separate from the first area.

20. An apparatus comprising:

a first module configured to receive uncompressed image data and perform a first encoding of the uncompressed image data by encoding at least one block of the uncompressed image data in a first pass;

a prediction module configured to store predictor pixels from the at least one encoded block in memory; and a second module configured to perform a second encoding of the uncompressed image data by encoding the at least one block of the uncompressed image data in a second pass using the predictor pixels stored from the first pass.

* * * * *